United States Patent [19]
May

[11] Patent Number: 5,680,679
[45] Date of Patent: *Oct. 28, 1997

[54] BUOYANT JEWELRY

[76] Inventor: David G. May, 28 Windsor Dr., Little Rock, Ark. 72209

[*] Notice: The term of this patent shall not extend beyond the expiration date of Pat. No. 5,015,085.

[21] Appl. No.: 83,530

[22] Filed: Jun. 30, 1993

Related U.S. Application Data

[60] Division of Ser. No. 694,888, May 2, 1991, Pat. No. 5,235,355, which is a continuation-in-part of Ser. No. 432,619, Nov. 6, 1989, Pat. No. 5,015,085.

[51] Int. Cl.⁶ ............................................. G02C 3/00
[52] U.S. Cl. .......................... 24/3.2; 24/3.3; 24/3.4; 24/3.6; 24/3.7
[58] Field of Search ........................ 63/11; 224/202, 224/219, 220, 257, 267, 221, 250; 24/3 C, 3 B, 300, 301, 3.2, 3.4, 3.3, 3.6, 3.7; 2/91, 208, 162, DIG. 11, 170, 452; 351/156, 43, 157; 441/6, 1, 75, 133, 136

[56] References Cited

U.S. PATENT DOCUMENTS

| | | | |
|---|---|---|---|
| 2,264,351 | 12/1941 | Willson | 351/156 X |
| 3,797,075 | 3/1974 | Seron | 224/202 X |
| 3,874,776 | 4/1975 | Seron . | |
| 4,133,604 | 1/1979 | Fuller . | |
| 4,541,696 | 9/1985 | Winger et al. | 351/156 X |
| 4,865,239 | 9/1989 | Timbrook | 224/220 X |
| 4,974,956 | 12/1990 | Gill . | |
| 5,019,000 | 5/1991 | Stephens | 441/6 |
| 5,046,200 | 9/1991 | Feder | 2/452 |
| 5,074,656 | 12/1991 | Parrish | 351/157 X |

Primary Examiner—James R. Brittain
Attorney, Agent, or Firm—Trent C. Keisling; Stephen D. Carver

[57] ABSTRACT

Buoyant jewelry for retaining and protecting personal articles. Each jewelry/retainer comprises a brightly colored, buoyant body coupled to one or more fasteners for securing various articles such as sunglasses, keys, or personal care products which the swimmer or water sportsman desires to conveniently retain. The jewelry items comprise eyeglass retainers, bracelets, anklets, name badges, and necklaces. The body comprises a resilient core of low-density foam covered by a flexible, tubular sheath. The sheath brightly colors and reinforces the body. In one mode the fasteners comprise resilient tubes for axially gripping the ear pieces of conventional glasses. An alternative fastener comprises a flexible fabric channel for receiving fine wire or wrap-around ear pieces. Another embodiment comprises a cord looped through an item to be floated, and an optional cap is provided for slip-fitting over existing containers of personal care products. An alternative jewelry item configuration comprises a buoyant loop formed by clamping the ends in generally parallel relationship, so that the fastener projects angularly away from the loop.

17 Claims, 4 Drawing Sheets

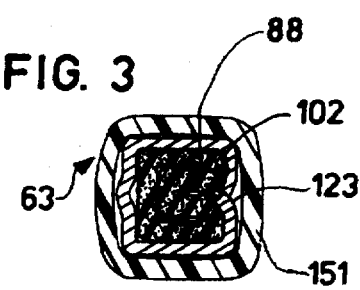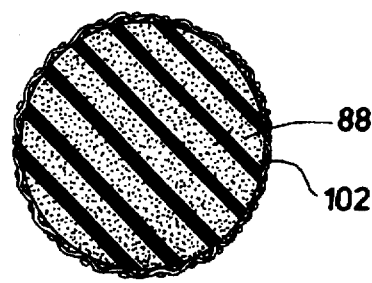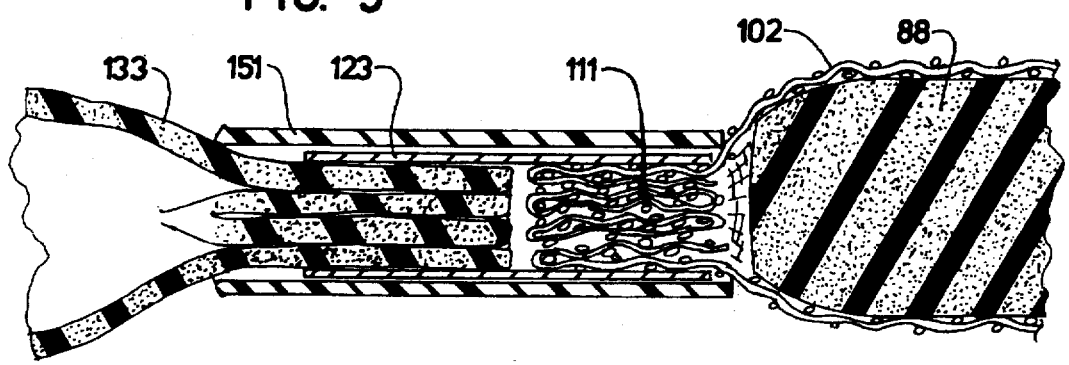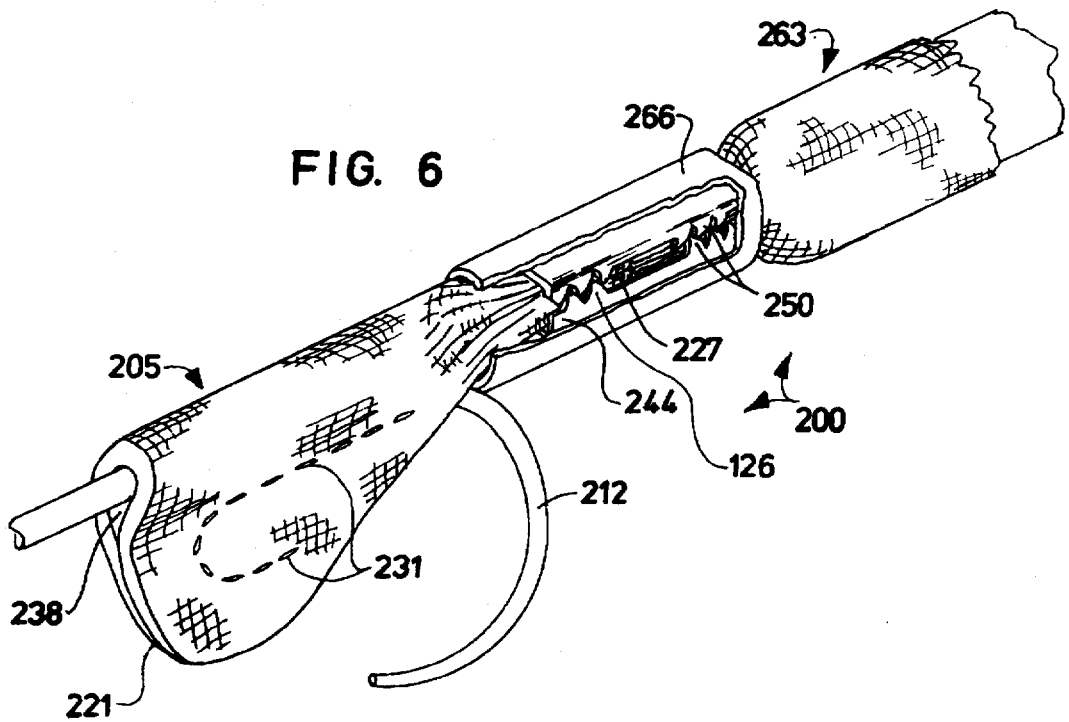

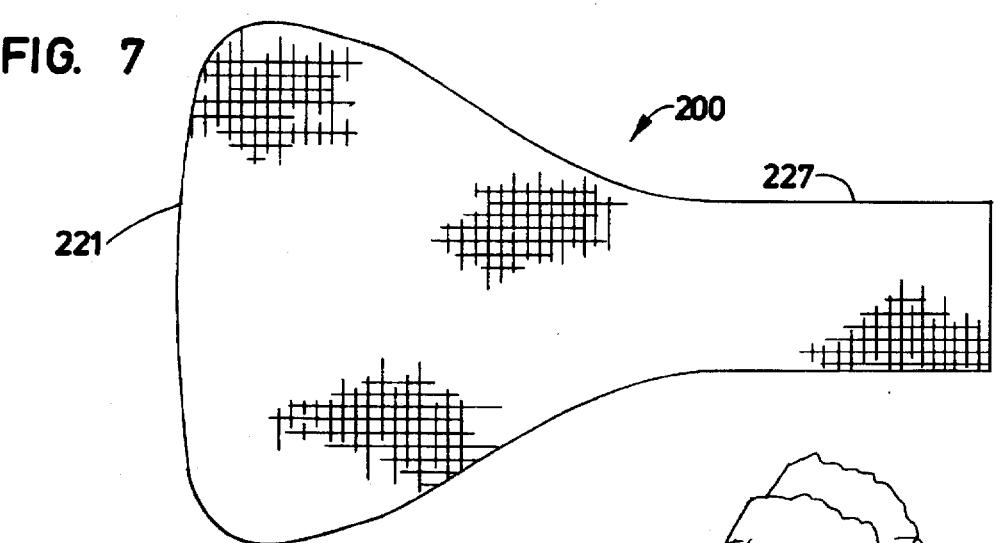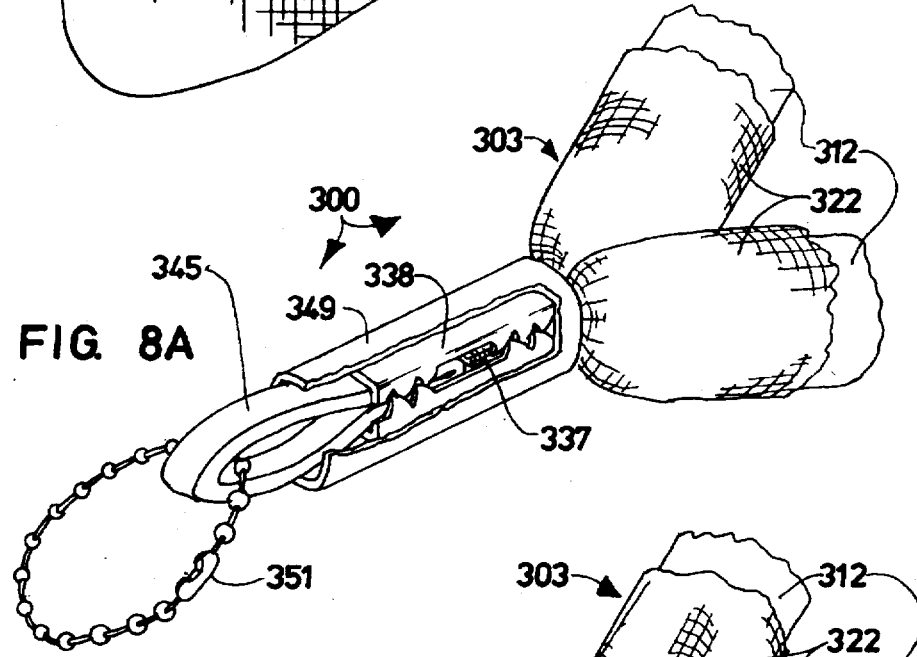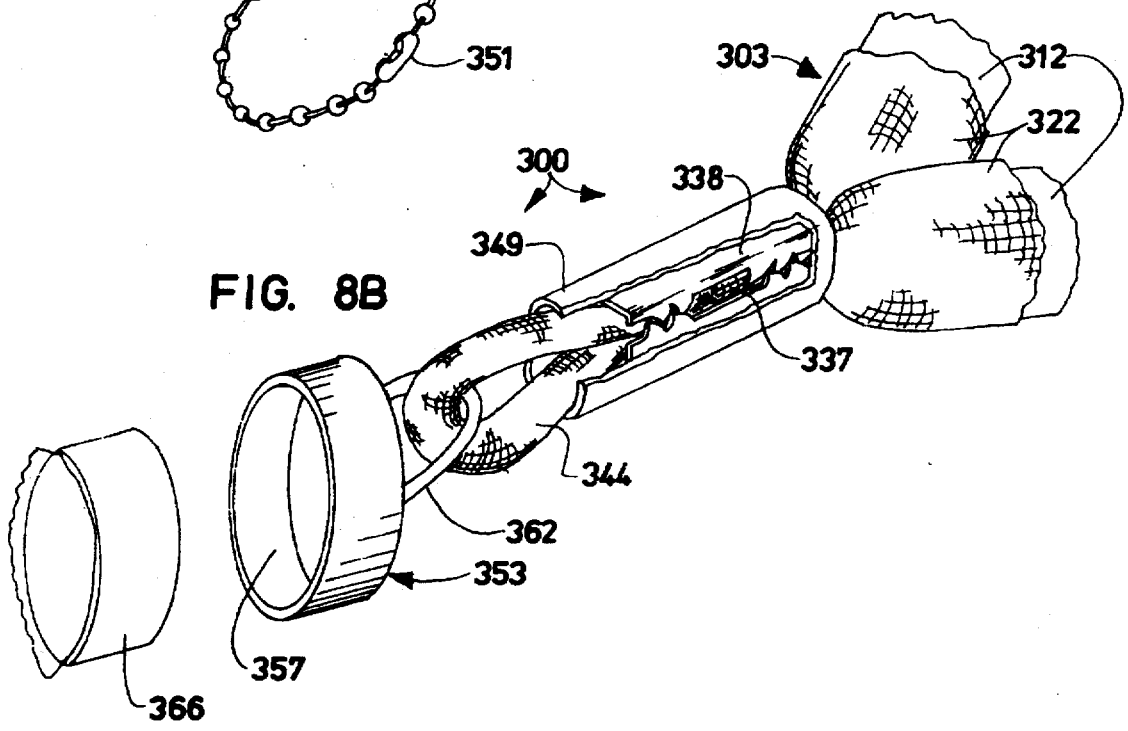

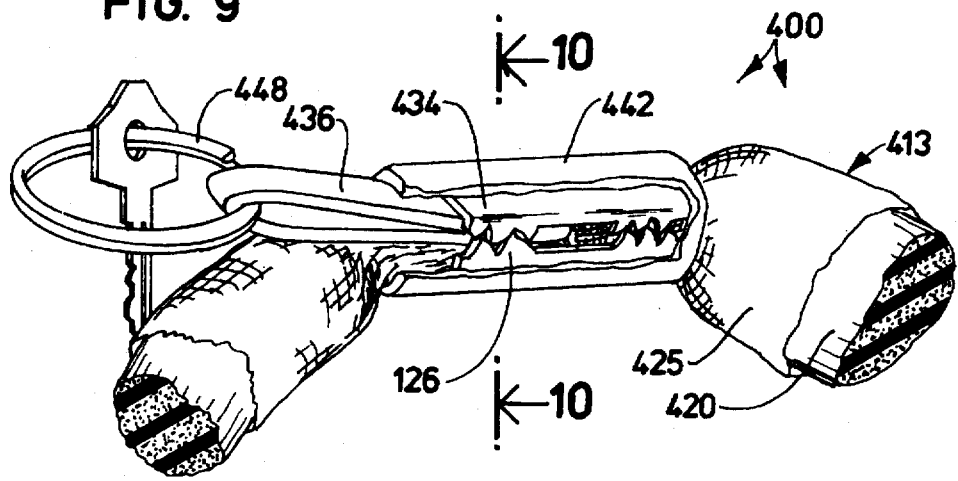
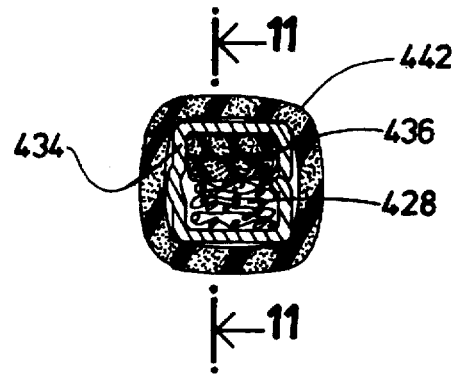
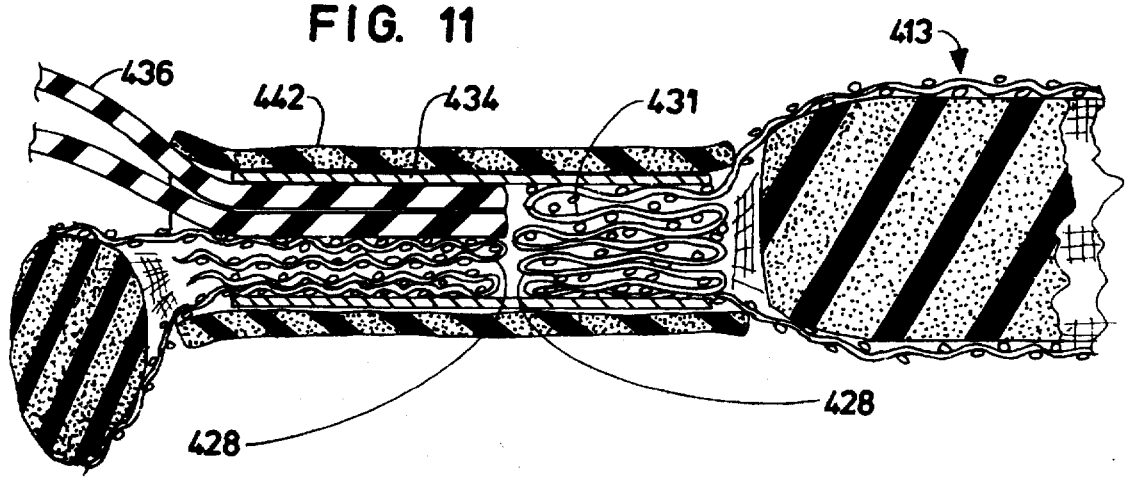

5,680,679

BUOYANT JEWELRY

CROSS-REFERENCE TO RELATED APPLICATION

This Application is a Divisional of my application, Ser. No. 07/694,888; Filing Date: May 2, 1991; Entitled: Buoyant Jewelry, now U.S. Pat. No. 5,235,355; which is a Continuation-in-part of Ser. No. 07/432,619, Entitled: Floatable Retainer for Eyeglasses, filed Nov. 6, 1989, now U.S. Pat. No. 5,015,085.

BACKGROUND OF THE INVENTION

This invention relates broadly to decorative jewelry articles for water related activities. More particularly, my invention relates to buoyant jewelry articles, especially adapted for beach use, for holding personal articles such as eye glasses, keys, sun tanning lotion, personal care products, name badges and the like.

As will be appreciated, personal items such as sunglasses, keys, and other beach accessories are easily misplaced, and may be quickly lost if dropped into the water. Unfortunately, conventional beachwear items seldom provide adequate pockets or pouches for conveniently storing such articles. Hence, it is desired to provide comfortable and attractive means for retaining such articles on the wearer's body, and for protecting them from loss in the water.

In the prior art known to me, various eyeglass retainers have been proposed for sportsmen. For example, the headband proposed by Fuller U.S. Pat. No. 4,133,604 issued Jan. 9, 1979, comprises a flexible band which terminates in a pair of tubular ends. The ends slidably engage the temple pieces, so that the eyeglasses are securely retained in position during sports activities and the like. U.S. Pat. No. 4,541,696 issued to Winger/Friedopher on Sep. 17, 1985 teaches a tubular, knit cord for retaining eyeglasses about the neck.

A similar device is illustrated in U.S. Pat. No. 2,481,946 issued to Pendleton on Sep. 13, 1949. U.S. Pat. No. 3,874,776 issued to Seron on Apr. 1, 1975 teaches a flexible eyeglass retainer which is adjustably coupled to the eyeglass templates by a flexible loop. Bloom, U.S. Pat. No. 2,660,092 issued Nov. 24, 1953 suggests the desirability of providing a flexible, adjustable-width, cushioned headstrap for retaining eyeglasses in position. The strap terminates at both ends in a flexible loop, which is captured by a slidable pin or hook associated with the glasses frame. McCulley U.S. Pat. No. 4,848,861 teaches an earpiece cushion for eyeglasses.

Various structures for floating a pair of glasses are also known in the prior art. For example, U.S. Pat. No. 3,711,190 issued to Blair on Jan. 16, 1973 comprises a blow-molded air cell which is threaded by resilient loops to the temples of the eyeglasses. Related devices are illustrated in U.S. Pat. No. 3,038,375 issued to Gansz on Jun. 12, 1962 and 3,390,938 issued to Gansz on Jul. 2, 1968. Floatable spectacles are taught by Goodman in U.S. Pat. No. 3,740,124 issued Jun. 19, 1973 and by Wilson in U.S. Pat. No. 3,517,989 issued Jun. 30, 1970.

However, none of the known prior art provides a comfortable, floatable jewelry item which doubles as an article retainer for beach items. The prior art known to me fails to adequately provide floatable means for attachment to various common beach items, especially those which are not already provided with a fastening pin, loop, or chain. The floatable retainer disclosed in my previous patent application is particularly well-suited for eyeglasses of ordinary configuration, having a generally straight ear piece. However, it does not contemplate securing very fine wire or wrap-around ear pieces, or retaining other swimmer's articles.

Most importantly, none of the prior art known to me satisfactorily addresses the need for providing a comfortable, attractive device for floatably retaining and thereby preventing the loss of a variety of different beach oriented accessories.

SUMMARY OF THE INVENTION

The buoyant jewelry of the present invention safely and comfortably suspends articles such as sunglasses, keys, personal care products, name badges and the like on the wearer's body. My jewelry products double as retainers which are ideal for use by swimmers or other water sportsmen. Each retainer comprises a brightly colored, buoyant body which may be comfortably looped about the neck or limbs of the wearer. Personal articles or accessories secured by my new jewelry will be kept afloat for long periods of time if inadvertently dropped into the water. If the jewelry is removed or inadvertently falls off, it can be easily spotted and retrieved.

Preferably the body comprises an elongated core of resilient, low-density closed cell foam, such as polyethylene or neoprene foam. Importantly, coloration and structural strength are achieved by a flexible, tubular sheath which covers the core. The sheath is preferably a unitary, knitted tube of fabric which resiliently grips the foam core. In the best mode it is seamless. Alternatively the sheath can be made of other materials, so it is not limited to knitted tubular cloth. For example, the sheath can be made of a vinyl coating which is usually dip dried on.

The ends of the sheath project to the ends of the core and are preferably sealed by a clamp or clamps. The clamps couple a fastener for attaching the desired article to the elongated body. The clamps are preferably obscured from view and undesired contact by a resilient, tubular cover which axially slip-fits over the clamp.

In the best mode, the fasteners comprise resilient, ovals which are constrained by compressed clamps. The ovals and clamps are substantially covered by small plastic tubes. A portion of the ovals emerging from the tubes may be penetrated by a portion of the item being held. For example, they may receive a portion of the ear pieces of conventional glasses to resiliently retain, suspend and/or float them. Alternatively the end fasteners may comprise flexible extruded latex rubber tubes attached to each end of the floatable body. The tubes may axially receive the ear pieces of conventional glasses and resiliently conform to firmly retain the ear pieces against slipping.

Alternative fasteners comprise flexible fabric grips stitched together to form a channel for receiving ear pieces. The fabric grips may be attached to opposing ends of the floatable jewelry. When eyeglasses, for example, are installed upon the fasteners, the tubular cover abuts the ear piece, frictionally engaging it to prevent it from slipping out of the fastener. Several different modes of attachment and fastening to eyeglasses can be employed, and are not limited to these before mentioned modes of attachment.

Another primary embodiment comprises a circular buoyant loop which is worn about the user's neck or limbs. In the preferred configuration of this embodiment, opposite ends of the buoyant body are fastened together by a single clamp associated with a fastener. The ends are aligned side-by-side, in generally parallel relationship within the clamp. Thus, the fastener element projects angularly away from the loop. One fastener arrangement comprises an oval or loop formed of resilient material which is attached to the buoyant body by a clamp. This resilient oval can be permanently attached to a resilient cap, key, name badge or the like. If the cap is used, it slip-fits over the cover of a conventional bottle or tube, such as a container for sun screen, lip balm, insect repellent, or other personal care products.

A third alternative configuration provides a small buoyant loop adapted to be worn about the wrist or ankle. The ends of the buoyant body are axially aligned end-to-end within the clamp, so that a smooth, unitary, circular configuration is achieved. The fastener comprises a resilient oval or loop which projects outwardly from the clamp alongside the buoyant loop. The loop is capable of receiving a chain or key ring.

Thus it is a fundamental object of the present invention to provide buoyant jewelry.

Another object is to provide brightly colored beach jewelry which assumes a variety of configurations.

A similar object is to provide beach jewelry which doubles as a retainer for securing personal items.

A still further object is to provide retainers capable of supporting various articles comfortably on the body of the wearer.

Another broad object of the present invention is to provide a decorative jewelry item which retains personal items such as eyeglasses, keys, and personal care products against loss and damage.

A further broad object is to provide jewelry which keeps personal articles afloat in the event they are dropped in the water.

Yet another object of the present invention is to provide a lightweight, comfortable retainer for eyeglasses.

An additional object of the present invention is to provide a buoyant retainer capable of floating personal articles such as eyeglasses, and keys until they can be retrieved from the water.

Still another object of the present invention is to provide a floatable article retainer for water sportsmen which may be comfortably worn about the neck, shoulder, or limbs.

Another object of the present invention is to provide a buoyant article retainer which facilitates detection and retrieval of an article lost or dropped in the water.

Yet another object of the present invention is to provide a buoyant retainer suitable for attaching tubes or bottles of personal care products.

An additional object of the present invention is to provide a buoyant retainer of the nature described which is suitable for attachment to a key chain or key ring.

A further specific object of the present object is to provide a body-worn, resilient, floatable retainer which can be used to retain eyeglasses having fine wire or wrap-around ear pieces.

An additional object of the present invention is to provide a high-visibility, buoyant retainer suitable for use by water sportsmen for retaining personal care products about the neck.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is an enlarged cross-sectional view taken generally along line 3—3 of FIG. 2;

FIG. 4 is an enlarged cross-sectional view taken generally along line 4—4 of FIG. 2;

FIG. 5 is an enlarged longitudinal cross-sectional view taken generally along line 5—5 of FIG. 2;

FIG. 6 is a fragmentary, perspective view of a first alternative fastener configuration;

FIG. 7 is an elevational view of the fastener of FIG. 5 prior to installation;

FIG. 8A is a fragmentary, perspective view of a second alternative embodiment, in which portions are broken away for clarity;

FIG. 8B is a fragmentary, perspective view of an alternative embodiment of the fastener of FIG. 8A, in which portions are broken away for clarity;

FIG. 9 is a fragmentary, perspective view of a third alternative embodiment, in which portions thereof are broken away for clarity;

FIG. 10 is an enlarged, cross-sectional view taken generally along line 10—10 of FIG. 9; and, FIG. 11 is a fragmentary, longitudinal sectional view taken generally along line 11—11 of FIG. 10.

DETAILED DESCRIPTION OF THE DRAWINGS

Figure 1:
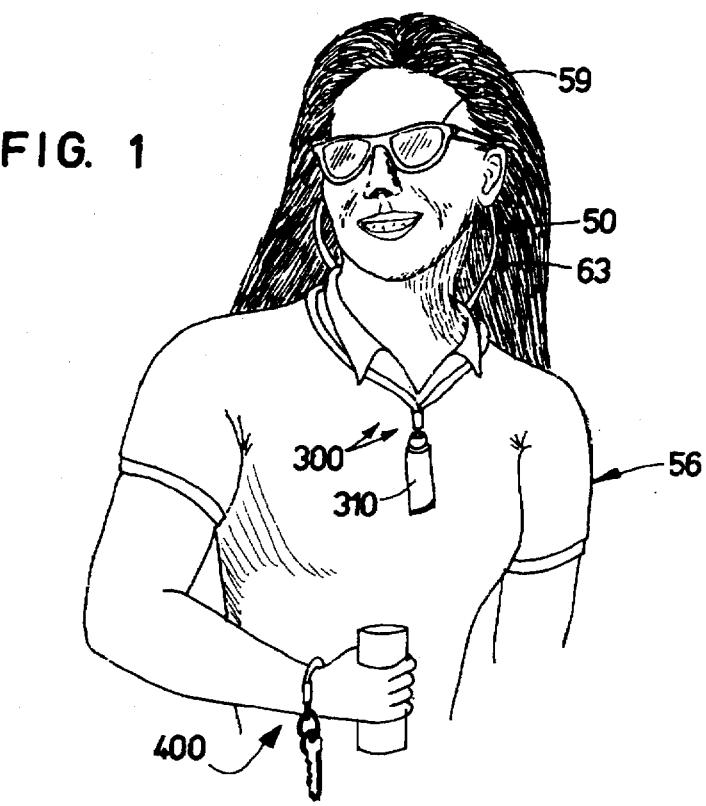
FIG. 1 is a pictorial view illustrating several modes of my Buoyant Jewelry worn by a typical user.

With reference to the accompanying drawings, various embodiments of my new buoyant jewelry/retainer invention are illustrated in use by a typical user. Hereinafter the nouns "jewelry" and "retainer" are used interchangeably. With initial reference to FIGS. 1–5, the best mode is broadly designated by the reference numeral 50. Retainer 50 is worn comfortably about the neck of a wearer 56 to secure a pair of sunglasses or eyeglasses 59.

Figure 2:
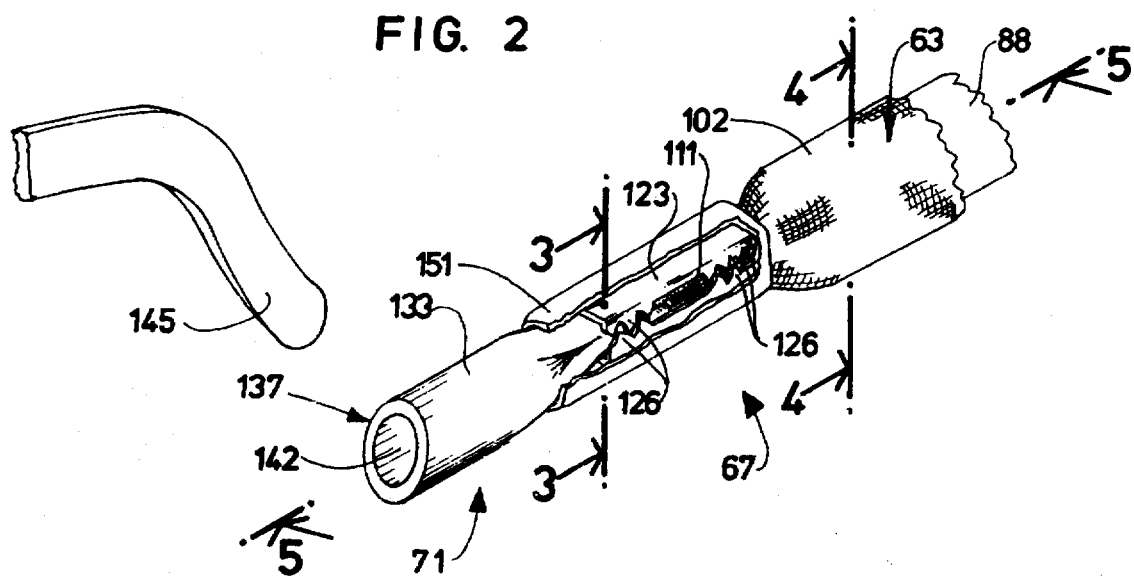
FIG. 2 is an enlarged, fragmentary, perspective view of one end fastener, in which portions are broken away for clarity.

Jewelry item 50 (FIG. 1) comprises an elongated body broadly designated by the reference numeral 63 (FIG. 2). Body 63 comprises a pair of ends 67. Resilient, tubular fasteners broadly designated by the reference numeral 71 are permanently coupled to each of the ends 67 and are slidably mounted upon the temple pieces of the wearer's glasses 59. With specific reference to FIG. 3, body 63 comprises a unitary, elongated, buoyant rod or core 88. (The nouns "core" and "rod" are used interchangeably).

Core 88 preferably comprises a lightweight, flexible low-density foam, such as neoprene or polyethylene foam. However, it will be appreciated that body 63 may also be constructed of other lightweight, buoyant material which can be molded into unitary, elongated body 63.

Core 88 is coaxially ensconced within a resilient, tubular sheath or covering 102. Sheath 102 preferably comprises a unitary, seamless tube of knitted fabric, such as polyester. Sheath 102 slip-fits over core 88, and it resiliently conforms to core 88 to provide a gripping surface. Preferably sheath 102 is comprised of a highly visible, brightly colored fabric which may be easily spotted against any natural background, such as water, sand, or furniture. Thus, retainer 50 immediately attracts attention to the glasses 59 so that they are not easily misplaced or inadvertently trampled. Moreover, if the glasses are dropped into the water, the brightly colored retainer 50 can be easily spotted on the water's surface, readily enabling retrieval.

As best viewed in FIGS. 2 and 5, the end 111 of sheath 102 and the end of the core 88 are crimped together. Thus, core 88 is completely enclosed when ends 111 are compressed by a rigid clamp 123 which permanently couples the fasteners to the body. As seen for example in FIGS. 2, 6 and 9, the tubular, preferably metallic clamp 123 comprises a plurality of spaced apart teeth 126. Teeth 126 capture the ends 111 (FIG. 2) of sheath 102 to firmly attach the fastener to the body 63. Members 126 at least partially capture fasteners 71 which couple the glasses 59 to the retainer.

In the best mode, fasteners 71 comprise a hollow tube 133 of smooth, resilient material such as neoprene or rubber. Its outer end 137 defines a hollow interior 142, into which the ear piece 145 of glasses 59 is coaxially fitted (FIG. 2). In use, tube 133 is slipped over ear piece 145, and resiliently conforms to the contour of the ear piece. Thus, glasses 59 are snugly, safely, and non-destructibly engaged and protected against slipping. Based on my experimentation, substantial force is required to extricate the ear piece from the tube 133 once properly mounted. Moreover, the soft resilient material rests very comfortably against the wearer's skin and does not irritate.

A tubular cover 151 preferably comprised of resilient, synthetic material slip-fits over the outer periphery of clamps 123. Cover 151 serves the dual purpose of shielding the wearer 56 from contact with the clamp 123 and of aesthetically obscuring the ends 111 of the sheath and tube 133 from view.

Even if the retainer 50 is removed or falls from the wearer's neck, glasses 59 remain firmly attached to the retainer. In the event the retainer 50 inadvertently falls into the water, the buoyant core 88 will keep the glasses afloat for an indefinite period. The floating glasses 59 may thus be readily detected and conveniently retrieved.

Reference is now directed to FIGS. 6–7, wherein a first alternative fastener configuration 200 is shown. This alternative configuration, is particularly well adapted for use on eyeglasses which have extremely fine, metallic, or wrap-around ear pieces 212 (FIG. 6). Fastener 205 is preferably formed of stitched fabric. It comprises a generally circular head 221 which terminates in an integral, elongated tail 227. In assembly, the circular head 221 is preferably folded in half and secured by stitches 231 or the like to form an interior channel 238. The ear piece 212 is installed axially through channel 238 and protrudes through the innards of the fastener, as best viewed in FIG. 6.

Tail 227 is axially secured within clamp 244 by gripping members 250. Clamp 244 which also engages the end of the buoyant retainer body 263. A tubular cover 266 similar to cover 151 of the best mode obscures the clamp 244 and fastener tail 227. Cover 266 also contacts the ear piece 212 and deflects it downwardly, which facilitates installation and prevents the ear piece from subsequently slipping out of fastener 200.

FIGS. 8A and 8B illustrate an alternative body configuration, broadly designated by the reference numeral 300. Retainer 300 can comfortably suspends a variety of articles about the wearer's neck. It will be appreciated that the same loop configuration 300 may also be comfortably worn about the shoulder, waist, or limbs, where desired.

Retainer 300 comprises an elongated, buoyant body 303 similar to body 63. Body 303 comprises a resilient, low-density foam core 312 covered by a resilient, preferably highly-colored, unitary tubular sheath 322. Body 303 is looped to fit about the wearer's neck. Ends 337 of sheath 322 project beyond the end of the foam body 303 to completely seal the core 312.

Alternative fastener designs comprise a resilient oval 345 (FIG. 8A) or a knitted loop 344 (FIG. 8B) secured to the ends of body 303 by toothed clamp 338. Loop 344 is secured by clamp 338, and the clamp 338 is preferably obscured by a resilient tubular cover 349 similar to cover 151. The body ends 327 are secured in side-by-side, generally parallel relationship. Thus the clamp and fastener project angularly outwardly or downwardly from the looped body, forming a mounting end which is outside the circular looped body.

One end of loop 344 or oval 345 projects outwardly beyond the edge of cover 349. In the embodiment of FIG. 8A, loop 344 receives a chain or key ring 351. In the alternative configuration of FIG. 8B, loop 344 permanently mounts a resilient, hollow, tubular, cap 353. Preferably cap 353 comprises an open end 357 and an integral mounting tab 362. Loop 344 is threadably mounted through tab 362 to permanently couple cap 353 to the retainer 300. Open end 357 of the cap preferably resiliently slip-fits over the end of an existing container 366, such as a tube or bottle containing a desired product. For example, container 366 may contain personal care products such as suntan lotion, lip balm, insect repellent, cosmetic products, or other product which the wearer 56 requires while enjoying water sports.

It will be appreciated that variations on the broad concept may be employed. For example, cap 353 might instead be replaced by a key chain 351 (FIG. 8A), a rigid ring, a medication holder, a snack container, or a novelty item having a suitable clasp or pre-defined mounting orifice similar to tab 362 (FIG. 8B). Retainer 300 will maintain the article afloat if it is inadvertently dropped into the water, so that it can be easily detected and retrieved.

With reference now to FIGS. 9–11, an alternative loop-type configuration comprises a wrist or ankle bracelet 400. The buoyant body 413 is similar to body 63, in that it comprises a resilient, low-density foam core 420 and a brightly-colored, flexible, protective sheath 425. As best viewed in FIG. 11, the ends 428 of body 425 are axially aligned, so that the sheath ends 431 are overlapped within rigid clamp 434. Preferably the clamp also secures a resilient, flexible oval 436 which projects outwardly to receive a selected article 448, such as a key ring or chain. The exposed end of the oval 436 projects outwardly from the clamp 434 alongside the body 413 to define a mounting orifice for receiving the selected article. As in the other embodiments, clamp 434 and the ends of sheath 425 and oval 436 are protectively obscured by a resilient cover 442.

The opposing ends of body 413 are axially aligned within the clamp 434. Thus, the mounting loop is parallel with the core, and a smoothly continuous, circular body results. Hence, the article may be safely and comfortably retained upon the bracelet 400 and worn about the wearer's wrist or ankle. In the event the bracelet is removed or slips off the wearer 56, the bright bracelet body 425 can be readily detected so that the article may be quickly retrieved. The bracelet will also keep smaller articles such as a room or car key afloat in the water for easy retrieval.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Buoyant jewelry for retaining and floating at least one item, said jewelry comprising:
   an elongated, flexible, buoyant body for floating said item, said body comprising:
      a resilient core having a pair of opposing ends and comprising low-density foam;
      an outer, tubular resiliently conforming and coaxially covering said core for strengthening and coloring said body;
   fastener means for coupling said item to one or both of said opposing ends; and,
   means for securing said fastener means to said body ends.

2. Jewelry as defined in claim 1 wherein said core comprises a low-density, closed-cell foam, and said sheath comprises a unitary, seamless knit tube of brightly-colored, water-impermeable material.

3. Buoyant jewelry for holding and floating an item, said jewelry comprising:
   an elongated, flexible body having a pair of opposing ends joined together to form a loop adapted to be worn or grasped by a user, said body comprising a flexible, low-density closed cell foam core and an outer, resiliently conforming, tubular sheath coaxially surrounding and covering said core for strengthening and coloring said body; and,
   said opposing ends connected together to form a loop to be either grasped by the user or worn about the limbs of the user.

4. Buoyant jewelry for floating and holding items, said jewelry comprising:
   an elongated, flexible cord having a pair of opposing ends, said cord comprising an inner, flexible buoyant core and an outer, tubular sheath coaxially surrounding said core for strengthening and coloring said jewelry;
   resilient oval means associated with at least one of said ends for engaging an item to be held;
   clamp means for securing said oval means to said cord ends by engaging both said cord and said sheath with an exposed end of said ovals emerging from said clamp means; and,
   tube means for coaxially covering said clamp means and at least a portion of said exposed end of said ovals, said tube means defining a small orifice in said ovals for resiliently grasping at least a portion of said item to be held.

5. The floating holder as defined in claim 4 wherein said sheath comprises brightly-colored seamless fabric.

6. Buoyant jewelry for retaining and floating at least one item, said jewelry comprising:
   an elongated, flexible, buoyant body for floating said item, said body comprising:
      a resilient core having a pair of opposing ends and comprising low-density foam;
      an outer, tubular sheath coaxially covering said core for strengthening and coloring said body;
   fastener means for coupling said item to one or both of said opposing ends;
   clamp means for securing said fastener means to said body ends; and,
   cover means for protectively obscuring said clamp means, said cover means coaxially fitted about said clamp means and at least a portion of said fastener means.

7. Jewelry as defined in claim 6 wherein said opposing ends are axially aligned within said clamp means to define a continuous, circular loop adapted to be worn about a limb of the wearer.

8. Jewelry as defined in claim 7 wherein said fastener means comprises resilient oval means secured by said clamp means to said body ends by said clamp means, whereby an exposed end of said oval means emerges from said clamp means and defines an orifice for resiliently receiving said item.

9. Buoyant jewelry for retaining and floating at least one item, said jewelry comprising:
   an elongated, flexible, buoyant body for floating said item, said body comprising:
      a resilient core having a pair of opposing ends and comprising low-density foam;
      an outer, tubular sheath coaxially covering said core for strengthening and coloring said body;
   fastener means for coupling said item to one or both of said opposing ends; and,
   clamp means for securing said fastener means to said body ends, said clamp means joining said opposing body ends to define a circular loop to be worn about the neck or limbs of a user.

10. Jewelry as defined in claim 9 wherein said fastener means comprises:
    a resilient loop;
    a resilient, cap having an open end for resiliently gripping said container and a closed end comprising an integral mounting tab; and,
    wherein said loop is permanently coupled to said mounting ring and secured by said clamp means.

11. Jewelry as defined in claim 9 wherein said fastener means comprises resilient oval means secured to said body ends by said clamp means, whereby an exposed end of said oval means emerges from said clamp means and defines an orifice for resiliently receiving said item.

12. Buoyant jewelry for holding and floating an item, said jewelry comprising:
    an elongated, flexible body having a pair of opposing ends joined together to form a loop adapted to be worn or grasped by a user, said body comprising a flexible, low-density closed cell foam core and an outer, resilient, tubular sheath coaxially surrounding and covering said core for strengthening and coloring said body;
    resilient, mounting means are coupled to said ends of said body for engaging at least one item; and,
    said opposing ends are secured in side-by-side, generally parallel relationship by clamp means to form a loop to be either grasped by the user or worn about the limbs of the user, whereby said mounting means projects outwardly from said loop.

13. Buoyant jewelry as defined in claim 12 wherein said sheath comprises a brightly-colored unitary, seamless fabric tube.

14. Buoyant jewelry as defined in claim 12 wherein said mounting means comprises a resilient oval secured to said body ends by said clamp means, whereby an exposed end of said oval emerges from said clamp means and defines an orifice for resiliently receiving said item.

15. Buoyant jewelry for floating and holding an item, said jewelry comprising:
- opposing ends adapted to be removably attached to said item;
- an inner, flexible, buoyant rod for floating said jewelry, said rod comprised of low density foam, said rod extending between said ends;
- an outer, tubular sheath which coaxially surrounds said rod for strengthening and coloring said jewelry, said sheath extending between said opposing ends;
- resilient oval means for engaging said item to be held;
- clamp means for securing said oval means to said ends with an exposed portion of said oval means emerging from said clamp means and having an orifice for receiving at least a portion of said item to be held; and,
- buoyant tube means for coaxially covering said clamp means and at least a portion of said exposed portion of said oval means, said tube means bordering said orifice and operable to frictionally grip at least a portion of the item to be held.

16. A retainer for securing articles to a person, said retainer adapted to float said article when separated from the person, said retainer comprising:
- an elongated, flexible, buoyant body for floating said article, said body comprising:
  - a resilient core having a pair of opposing ends and comprising low-density foam;
  - an outer, tubular sheath coaxially covering said core for strengthening and coloring said body;
- fastener means for coupling said article(s) to said body; and,
- means for securing said fastener means to said body.

17. An elongated, colored float secured to an article to provide buoyancy and attract attention to the article when it is separated from a person, said float thus adapted to enable the person to readily recover the article, said float comprising:
- an elongated, flexible, buoyant body, said body comprising:
  - a resilient core having a pair of opposing ends and comprising low-density foam;
  - an outer, tubular sheath resiliently conforming to and coaxially covering said core for strengthening and coloring said body.

* * * * *